United States Patent [19]

Edwards et al.

[11] Patent Number: 5,073,046
[45] Date of Patent: Dec. 17, 1991

[54] CONNECTOR WITH FLOATING ALIGNMENT FEATURE

[75] Inventors: Bryan T. Edwards, Camp Hill; Steven L. Flickinger, Hummelstown; James D. Kevern, Wellsville; David D. Sonner, Harrisburg; Robert N. Weber, Hummelstown; Jeffrey A. Zeiders, Middletown, all of Pa.

[73] Assignee: AMP Incorporated, Harrisburg, Pa.

[21] Appl. No.: 686,896

[22] Filed: Apr. 17, 1991

Related U.S. Application Data

[63] Continuation-in-part of Ser. No. 667,724, Mar. 11, 1991.

[51] Int. Cl.[5] .............................................. G02B 6/26
[52] U.S. Cl. ....................................... 385/90; 385/78; 385/92
[58] Field of Search ................ 350/96.20, 96.21, 96.22, 350/96.23; 250/227.11

[56] References Cited

U.S. PATENT DOCUMENTS

| | | | |
|---|---|---|---|
| 4,291,943 | 9/1981 | Binek et al. | 350/96.22 |
| 4,427,879 | 1/1984 | Becher et al. | 350/96.20 X |
| 4,611,887 | 9/1986 | Glover et al. | 350/96.21 |
| 4,634,214 | 1/1987 | Cannon, Jr.; et al. | 350/96.20 |
| 4,787,706 | 11/1988 | Cannon, Jr.; et al. | 350/96.20 |
| 4,872,736 | 10/1989 | Myers et al. | 350/96.20 |
| 4,960,317 | 10/1990 | Briggs et al. | 350/96.21 |
| 4,979,793 | 12/1990 | Bowen et al. | 350/96.20 |
| 4,982,083 | 1/1991 | Graham et al. | 350/96.20 |
| 4,993,803 | 2/1991 | Suverison et al. | 350/96.20 |
| 5,016,968 | 5/1991 | Hammond et al. | 350/96.20 |

*Primary Examiner*—Brian Healy

[57] ABSTRACT

A connector for joining light transmitting fiber cables through a cover (14) to a transmitter and/or receiver device (3) comprises a plug connector half (6) and a retention frame (48). The plug connector half (6) comprises a plug (8) having profiled passageway (43) for receiving an optical fiber, a transceiver adapter (10) adapted to axially receive the plug (8) through the cover (14) and extending axially for aligning the plug (8) forward relative to the transmitter and/or receiver device (3). The retention frame (48) is mounted to the cover (14) and captivates the transceiver adapter (10) with play so as to permit free floating of the transceiver adapter (10) relative to the cover within the retention frame (48). The transceiver adapter (10) is an integral two-part structure comprising a transceiver shroud (11) adapted to axially receive the plug (8) and extending axially (38) for aligning the plug (8) relative to the transmitter and/or receiver device(3), and further having a latching beam mechanism (12) having forward extending latching beams (13).

12 Claims, 8 Drawing Sheets

CONNECTOR WITH FLOATING ALIGNMENT FEATURE

FIELD OF THE INVENTION

This application is a continuation-in-part of U.S. Application Ser. No. 07/667,724 filed Mar. 11, 1991, pending, Edwards I. The present invention relates to an optical fiber connector with an alignment feature for positioning, aligning, and guiding mating electrical or optical connector halves.

BACKGROUND OF THE INVENTION

As pointed out in Edwards I, it is standard practice with respect to mating connectors to provide means which position the connector halves so that the terminals therein are aligned for a proper mating engagement. It is common to provide pins, posts, and projections in one half made to fit within complementary apertures in the other half; both integrally molded with respect to the housings of the connector halves, or added as hardware. One problem associated with interconnecting of connector halves arises when the halves are of different suppliers and are not complementary. In such instances it is necessary to provide an adapter that alters one or both of the connector halves so as to permit interconnection. A particular instance of such problem involves the replacement, within a computer bulkhead, of a circuit board-mounted transceiver of one manufacturer with a circuit board-mounted transceiver of another manufacturer. In such instance the replacement board may be characterized by receiver and transmitter ports of alignment differing from the alignment of the ports of the transceiver board which has been replaced. Precise connection between the transceiver ports with a connector through the backplane of the computer bulkhead may be difficult if, indeed, connection may be made at all. Edwards I addresses the problem of the differing fit of circuit boards, and generally the problem of precise fit between connector halves, by providing a connector half with a latching beam mechanism feature for positioning, aligning and guiding mating connector halves and for providing improved retention between the resulting, mated halves. Edwards I particularly addresses the joining of light transmitting fiber cables through a cover or panel front to a transmitter and/or receiver. The Edwards I connector is characterized by a latching beam mechanism that provides both an improved aligning feature during intermating and improved retention while interconnected. The connector comprises a plug connector half and a clip connector half. The plug connector half comprises a plug having an axially extending bore for receiving an optical fiber, and a transceiver adapter adapted to axially receive the plug through the cover. The transceiver adapter extends axially for aligning the plug forward relative to the transmitter and/or receiver device. The transceiver adapter is a two-part structure comprising a transceiver shroud and a latching beam mechanism. The mechanism comprises a main body straddling the shroud, and secured thereto, and having latching beams extending therefrom. Each latching beam is an elongated structural member which is secured at one end to the main body of the mechanism and which is freely flexible at the forward opposite end. Each beam has a forward beveled face and port. The Edwards I connector further comprises a clip connector half attached to and integral with the transmitter/receiver device and having apertures therein beveled to receive the latching beams.

During interconnection, connector halves must approach one another within the connection envelope which is the area through which each half must pass in approaching so as to accomplish fit of one half to the other. The envelope may be enlarged to accommodate a greater area of misalignment by the utilization of certain mechanisms such as the complementary beveled latching beams and aperture surfaces of the clip of Edwards I, wherein the beveled surfaces permit the guiding of the beam heads from a misaligned juxtaposition to an entry into the corresponding accepting apertures of the clip connector half.

The present invention relates to an alignment feature for connector halves which feature may be used in conjunction with the aligning pins of the forward mating face of a transceiver adapter as taught by Briggs et al. (14958), or with the beveled latching beam feature disclosed and claimed by Edwards I or in conjunction with any connector for mating a circuit board with transmitter and/or receiver to a plug connector. The present invention is particularly applicable in instances where the misalignment of a mating board is such that the beveled faces of the aligning pins or latch beams are unable to come into contact with complementary beveled faces of the apertures of the clip connector half because they are outside of the connection envelope.

It is an object of the present invention to provide a connector with a floating alignment feature that permits interconnection between connector halves of a variety of types. It is particularly an object of the present invention to provide an improved connection between a board mounted transmitter and/or receiver and a shrouded plug connector, as for example, a connection between a Fiber Distributed Data Interface (FDDI) and a connector of the Fixed Shroud Duplex (FSD) type.

SUMMARY OF THE INVENTION

The present invention relates to a connector for joining light transmitting fiber cables through a cover to a transmitter and/or receiver device. The connector is characterized by a floating alignment feature that permits realignment of a plug connector half so as to accommodate a misaligned connector half during intermating. The connector comprises a plug connector half and a clip connector half. The plug half is characterized by a retention frame mounted to the cover to captivate a transceiver adapter with play of the adapter within the frame so as to permit free floating of the transceiver adapter relative to the cover within the retention frame.

The retention frame comprises a main beam and arms extending from the main beam to form a yoke shaped body. Each of the arms is characterized by a rearward extending pedestal defining a gap between each pedestal and the main beam. The retention frame is mounted to the cover through each pedestal whereby each pedestal and main beam defines spacings between the cover and the retention frame.

The transceiver adapter further comprises flanges extending on either side of the adapter, each of the flanges being smaller in size than each of the spacings defined by the cover and the retention frame. Each flange fits within a respective spacing whereby the frame captivates the transceiver adapter with play of the adapter within the frame so as to permit free floating of the transceiver adapter relative to the cover within the retention frame.

The transceiver adapter may be a two-part structure comprising a transceiver shroud and a latching beam mechanism. The shroud is adapted to axially receive the plug and extends axially for aligning the plug forward relative to the transmitter and/or receiver device. The latching beam mechanism is integral with the shroud and has forward extending latching beams.

Further, the connector comprises a clip connector half attached to and integral with the transmitter/receiver device and having apertures therein beveled to receive the latching beams. Each of the latching beams has a beveled forward end for interacting with the respective beveled aperture of the clip connector half to align the beam to the opening upon mating of the plug connector half to the clip connector half.

DESCRIPTION OF A PREFERRED EMBODIMENT

Referring to FIGS. 1, 3A, 3B, 4A and 4B, an electronic package 1 is shown to include a mounting structure 2 which may be a printed circuit board carrying circuit traces to electronic components such as logic and memory devices. Mounted on structure 2 is a transmitter/receiver device 3 which includes a pair of signal ports 4 suitably interconnected to components which convert electrical to optical and optical to electrical signals, i.e. transmitters and receivers. Shown also, is clip connector 5 which is a connector half, and which with half structure 6 comprises the connector 7 of the present invention as hereinafter described.

Half structure 6 includes plug 8 terminating a cable 9 to a forward portion, and transceiver adapter 10. Transceiver adapter 10 is shown as a two part structure comprising a transceiver shroud 11 and latching beam mechanism 12. Transceiver shroud 11 is adapted to axially receive plug 8. The shroud 11 extends axially for aligning the plug relative to the transmitter/receiver device 3. The latching beam mechanism 12 has latching beams 13 extending therefrom. The connector half 6 is mounted, as indicated, in a mounting structure which may be considered, in the embodiment here involved, as a panel front or cover 14 which encloses the interconnection when the connector halves 5, 6 are mated through window 15 of the panel front 14.

Figures 1, 2:
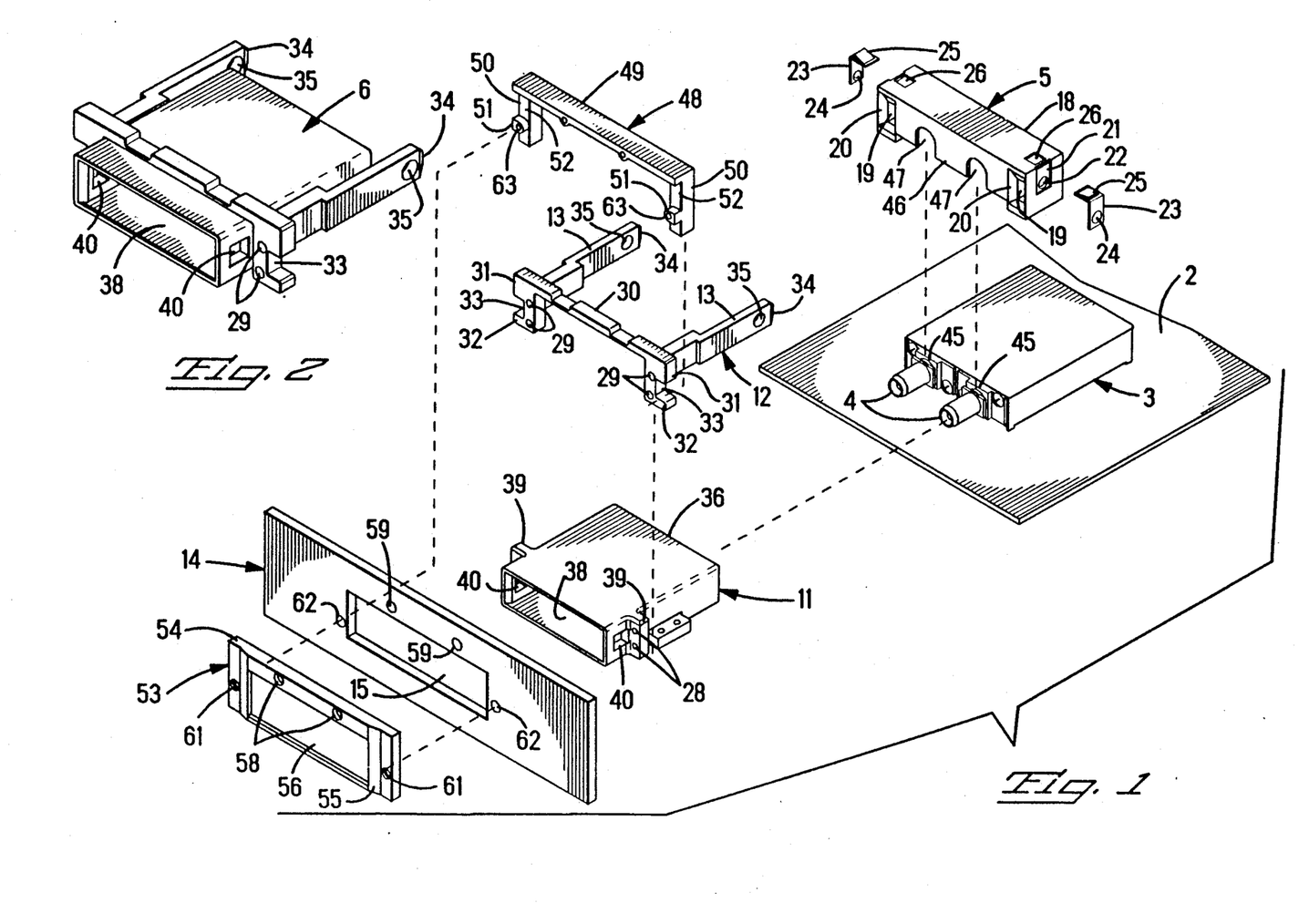
FIG. 1 is a perspective view, partially exploded, of the connector of the present invention along with a cover and transmitter and/or receiver device.
FIG. 2 is a perspective view of a molded single piece transceiver adapter, one of the embodiments of the present invention.

The plug connector half 6 further comprises strain relief means 16 which is a tubular member with integral means for distributing bending substantially along its length. The plug 8 has a threaded end (not shown). Cap 17 has a threaded bore complementary to the end of the plug 8, and has a bore of decreased opening for capturing the strain relief 16 when the cap 17 is interengaged with the threaded end of the plug 8.

Figures 3A, 3B:
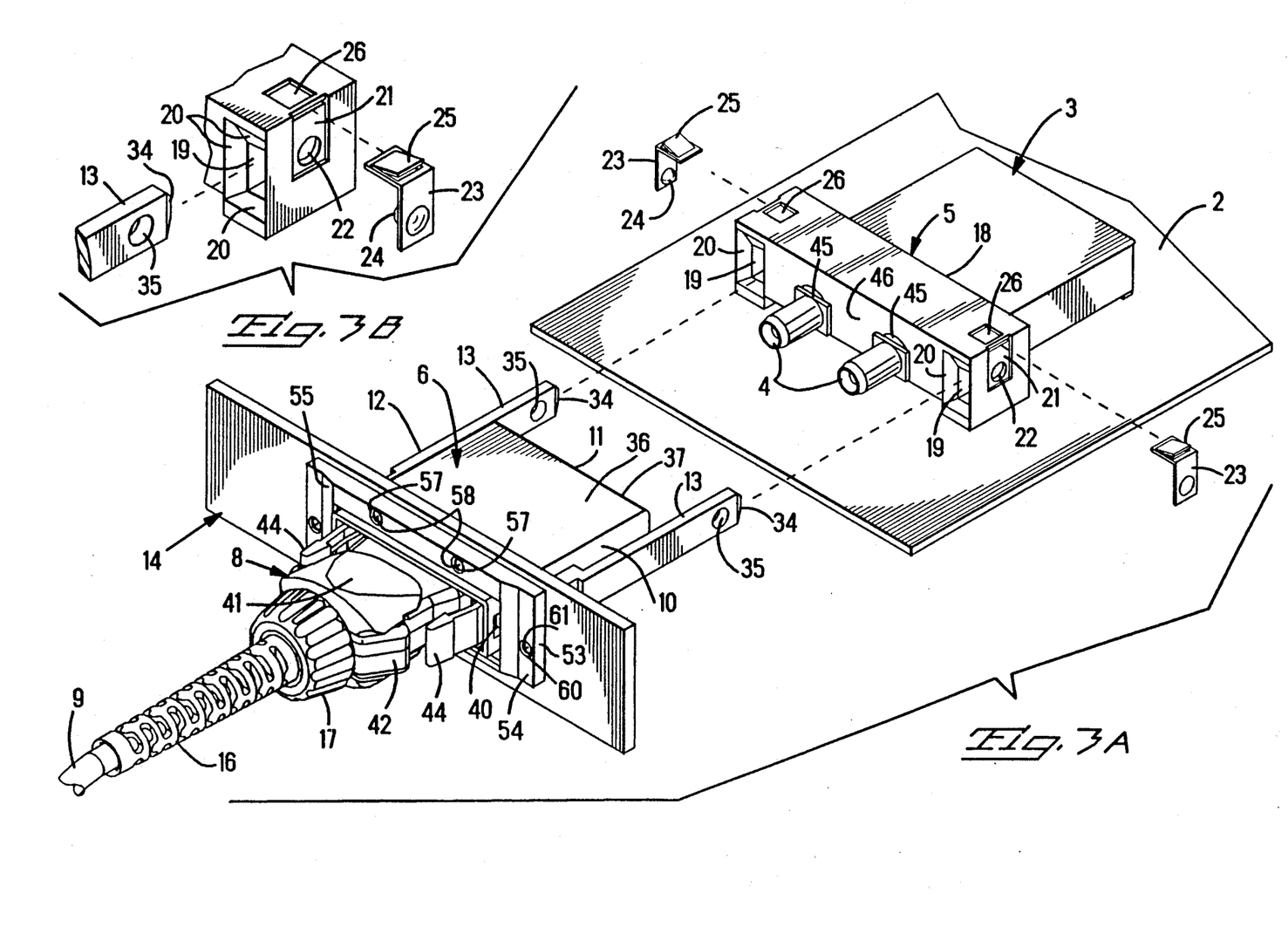
FIG. 3A is a perspective view showing connector halves preparatory to mating, along with associated mounting structures.
FIG. 3B is an exploded perspective view of the connection between a latching beam and aperture showing clip retention window and clip.
Figures 4A, 4B:
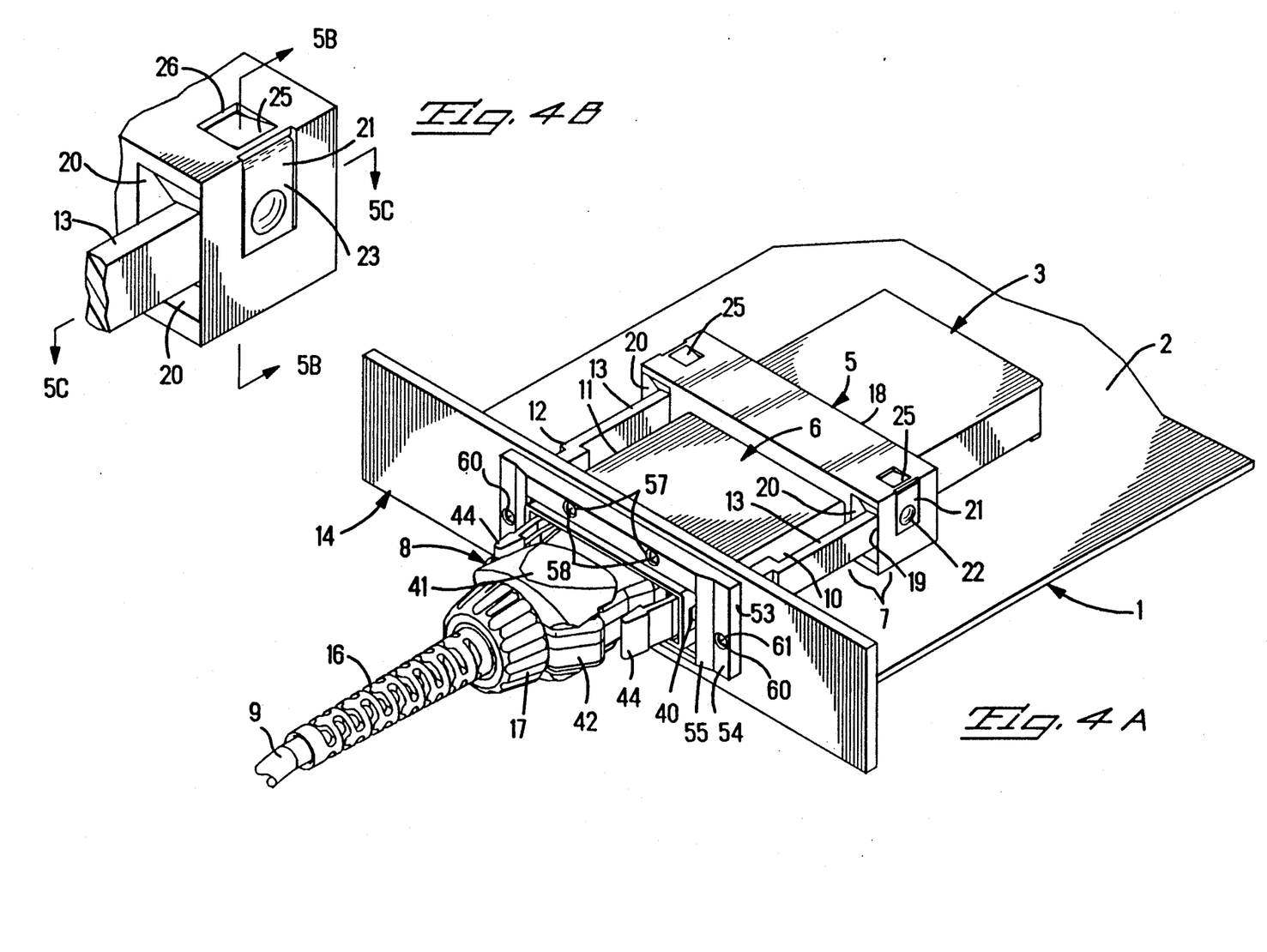
FIG. 4A is a perspective view showing mated connector halves along with associated mounting structures.
FIG. 4B is a perspective view of a connected latching beam and aperture.
Figure 5A:
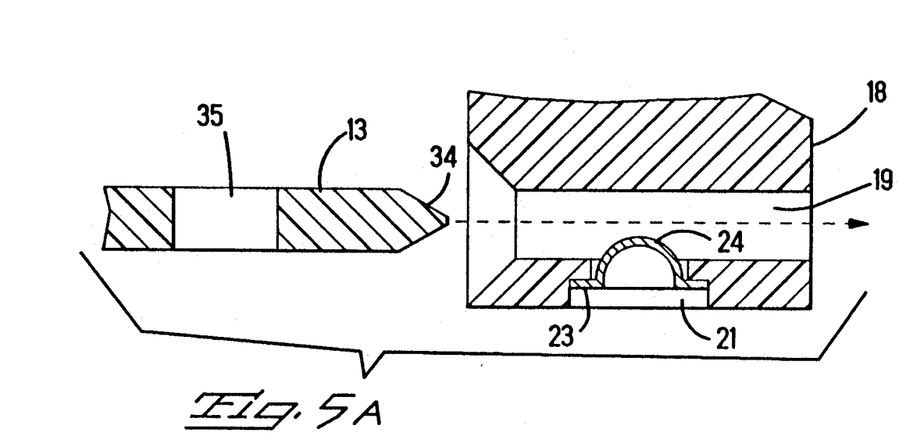
FIG. 5A is a cut away view of latching beam, aperture and clip during mating.
Figure 5B:
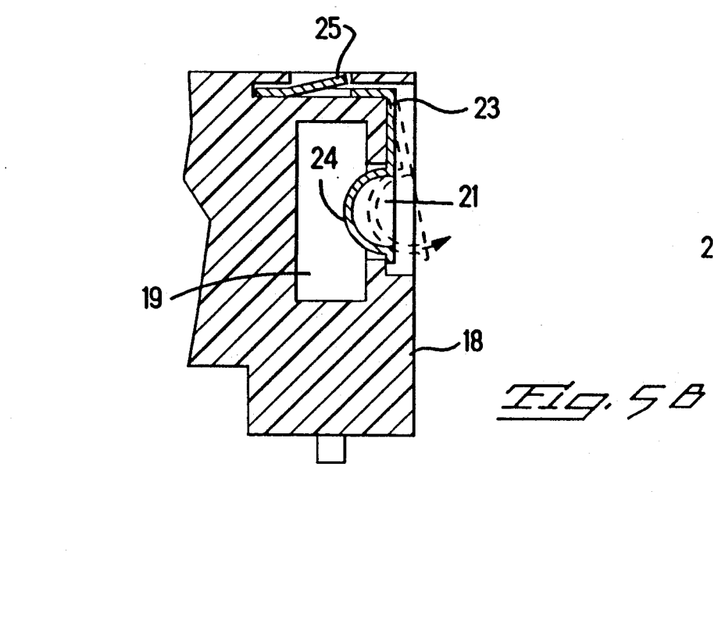
FIG. 5B is a cut away view through line 5B-5B FIG. 4B.
Figure 5C:
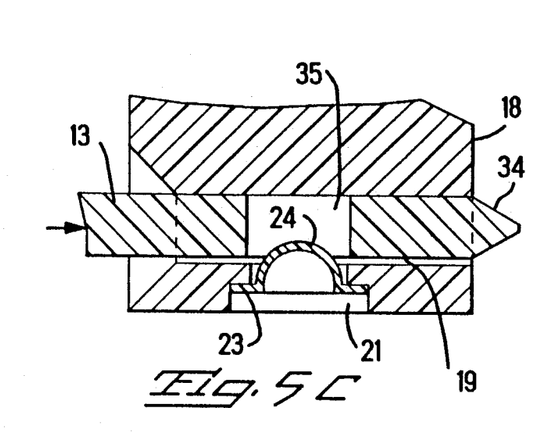
FIG. 5C is a cut away view through line 5C-5C of FIG. 4B.

Shown in FIGS. 1, 3A, 3B, 4A, 4B, 5A, 5B and 5C, clip connector half 5 comprises a cover body 18 having apertures 19 which are beveled 20 to receive latching beams 13 which, upon connection, are guided into the apertures 19 by the beveling 20. Clip connector half 5 further comprises clip retention window 21 coextensive with each of apertures 19 through port 22 common to both the retention window 21 and the aperture 19, and further comprises clips 23 each with dimple 24. Each clip 23 has wing 25 which is a portion of the clip 23 biased upward to form the said wing 25 with function as hereinafter described. As illustrated in FIGS. 5A, 5B and 5C, the clips 23 are adapted to fit within respective retention window 21 with dimple 24 biased through respective port 22 in the window 21 and wing 25 providing retention by snap fit within a second window 26 of the half connector 5.

Figure 6:
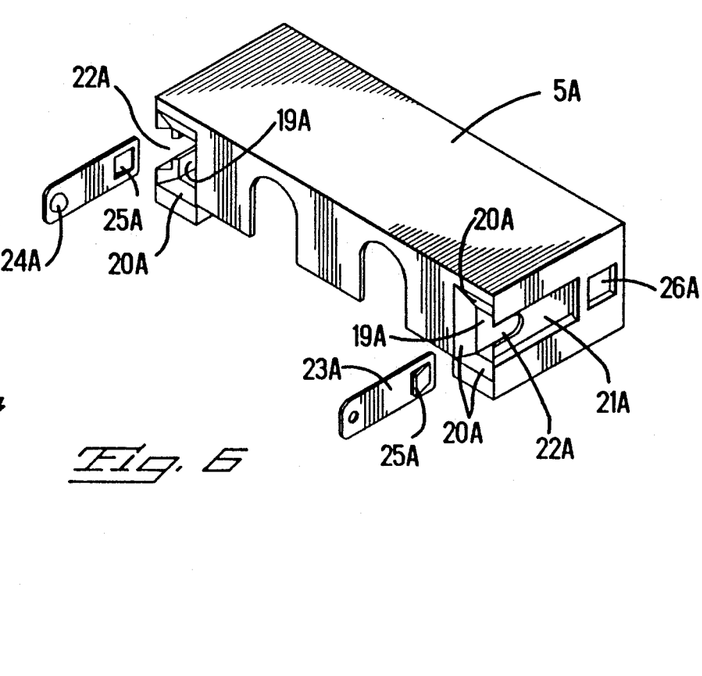
FIG. 6 is a perspective view of another, and preferred, embodiment of the clip connector half of the invention.

Shown in FIG. 6 is a clip connector half 5A which is another embodiment of the present invention. The clip half 5A comprises clip retention windows 21A and 26A. Each window 21A is coextensive to each of apertures 19A via slot 22A common to both the retention window 21A and aperture 19A. Connector half 5A further comprises clip 23A with dimple 24A and wing 25A adapted to clip within the retention window 21A and to within window 26A with dimple 24A biased through slot 22A in window 21A and into engagement with latching beam 13, and with wing 25A retained within window 26A.

The transceiver adapter 10 may be a molded integral structure as shown in FIG. 2 characterized by a transceiver shroud portion 11 and latching beam mechanism portion 12 or the adapter 10 may be a two part structure, as shown in the FIGS. 1, 3A and 4A, comprising a transceiver shroud part 11 and a latching beam mechanism 12 secured together with an interengaging means to form said integral two part structure the transceiver adapter 10. The inter-engaging means may be bolts 27 through the commonly aligned holes 28 of the transceiver shroud 11 and holes 29 of the latching beam mechanism 12. Notable is that the transceiver adapter 10 is located within the cover 14 and receives the plug 8 through window 15 to within the cover 14 enclosure. By fixing the location of the adapter 14 within the enclosure, the position of the transceiver 3 is set. If the adapter 10 were positioned outside of the enclosure then location of the transceiver 3 would be dependant upon the thickness of the cover 14. Changing between different covers 14 of different thicknesses would otherwise require relocation of the mounting of the transceiver 3 and clip connector half 5 within the enclosure. This problem is eliminated with the positioning of the adapter 10 in accord with the present invention.

Referring to FIGS. 1, 3A and 4A, latching beam mechanism 12 is in the form of a main body 30 having latching beams 13 extending therefrom and side extending flanges, both upper 31 and lower 32, which define a gap 33 with utility as hereinafter described. Each latching beam 13 is a beam shaped body with forward beveled face 34 and port 35. When interconnected to form transceiver adapter 10, the main body 30 of the latching beam mechanism 12 straddles shroud 11 with interengaging holes 28 aligned with holes 29 of the shroud 11 as aforesaid.

Transceiver shroud 11 consists of a body 36 having forward mating face 37, axial cavity 38 to receive the plug 8, extending flanges 39 with holes 29 and latch ports 40 to both sides of body 36.

Plug 8 is constructed for disconnect coupling through means of transceiver adapter 10 and is a hollow body of molded upper cover 41 and molded lower cover 42. The covers 41, 42 are of insulated plastic material formed by molding into a shape that has an exterior with dimensions that intermate with the transmitter/receiver via transceiver adapter 10. Upper cover 41 and lower cover 42 are complementarily contoured in their interiors so as to form a profiled passageway 43 having optical cables disposed therein. Upper cover 41 intermates with lower cover 42 by snap-in connection. Threaded cap 17 secures the upper cover 41 together with the lower cover 42 to encompass and provide an enclosure for the optical fibers of optical cable 9. The plug 8 is secured within the transceiver adapter 10 by biased fit of latches 44 through latch ports 40.

Further shown in FIGS. 1, 3A and 4A is transmitter/receiver device 3 and clip connector half 5. Transmitter/receiver ports 4 have square bases which form flanges 45. Clip connector half 5 is formed of cover body 18 having mating face 46 characterized by openings 47 which form lips that snap fit onto flanges 45.

With reference to FIGS. 1, 3A, 3B, 4A, 4B, 5A, 5B and 5C, during connection of plug connector half 6 with clip connector half 5, the apertures 19 of clip connector half 5 receive respective latching beams 13 of plug connector half 6 with each bevel 20 interacting with the respective beveled face 34 of each latching beam 13 to guide each latching beam 13 into a respective receiving aperture 19. Simultaneously, transceiver/receiver device 3 passes into axial cavity 38 of transceiver shroud 11 thereby connecting the transmitter and/or receiver 3 to a respective optical fiber disposed within the transceiver shroud 11.

Again, with reference to FIGS. 1, 3A, 4A, 6A, 6B, 7A, 7B, 7C, 7D and 7E, shown is the floating fit of the transceiver adapter 10 which permits alignment to transmitter/receiver device 3 and to clip connector half 5 even in circumstances where these elements may be misaligned thus prohibiting proper mating with prior art transceiver adapters 10 and associated mountings. By the present invention, is provided a retention frame 48 with main beam 49 and extending arms 50 each with rearward extending pedestals 51 which, with rearward extending beam 49 define gaps 52. Retention frame 48 is adapted to straddle transceiver adapter 10 and be immobilized by a secure connection to cover 14 which is provided by an interconnection to cover plate 53. Cover plate 53 has two sections, a relatively flat section 54, the bottom of which fits flush to cover 14, and an outcrop section 55 that rises from the plane of the flat section 54 and which defines cover plate window 56. Cover plate 53 is secured to cover 14 by bolts 57 or the like through holes 58 of cover plate 53 and holes 59 of cover 14. The interconnection means between retention frame 48 and plate 53 may be a bolt 60 or the like through commonly aligned holes 61 of cover plate 53, holes 62 of cover 14 and holes 63 of retention frame 48.

Figures 6A, 6B:
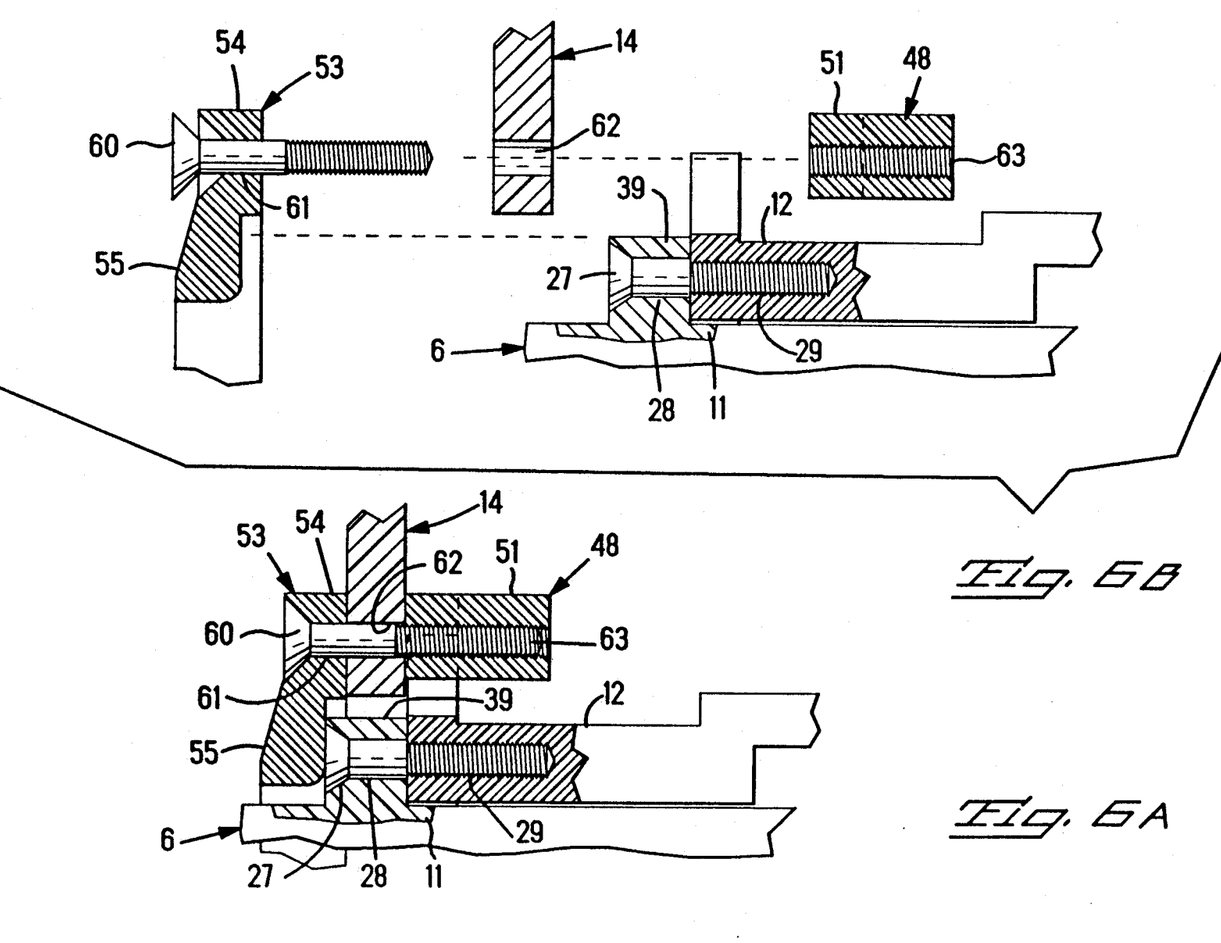
FIG. 6A is a cut away view through the interconnection among the cover plate, panel and half structure of FIG. 4A.
FIG. 6B is a cut away view through the same but with some parts expoded.

With the straddling of retention frame 48 over transceiver adapter 10, and the interconnection of the frame 48 to cover 14 and to plate 53, pedestals 51 fit within respective gaps 33 of latching beam mechanism 12. Each gap 52 of retention frame 48 is particularly defined by main body 49 and pedestal 51 so as to loosely accommodate respective flange 31 of latching beam mechanism 12, and gap 33 of latching mechanism 12 is particularly defined by respective upper 31 and lower 32 flanges so as to loosely accommodate respective pedestal 51 of frame 48 whereby transceiver adapter 10 is captivated by retention frame 48 but in such a manner as to permit vertical movement of the adapter 10 within said frame 48 and relative to said cover 14. Further, the spacing between the pedestals 51 exceeds the distance between the gaps 33 so that the transceiver adapter 10 is permitted horizontal movement as well.

Figure 7A:
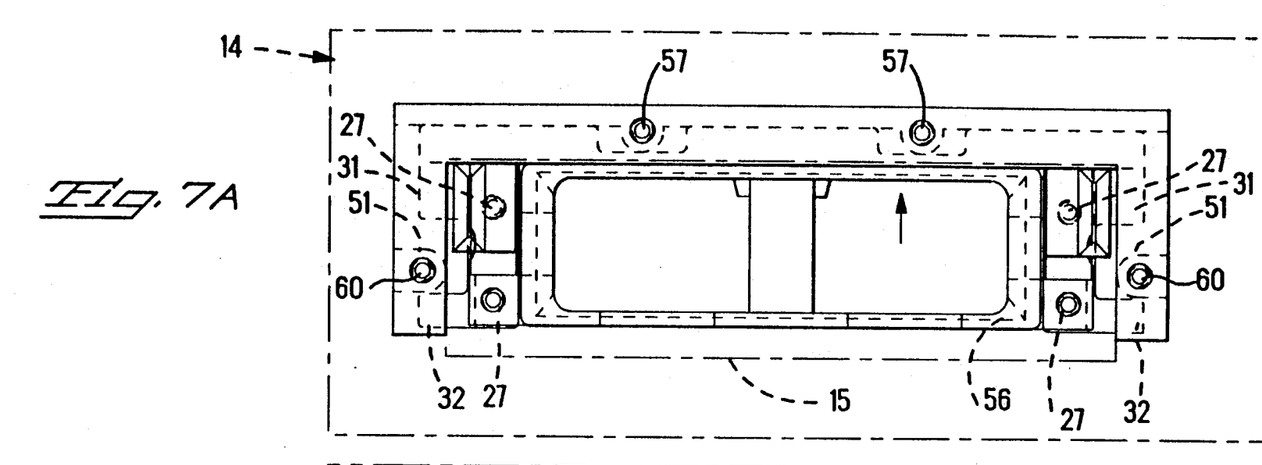
FIGS. 7A, 7B, 7C, 7D and 7E are all elevation views from a rear position showing the panel front and the connector of the present invention.
Figure 7B:
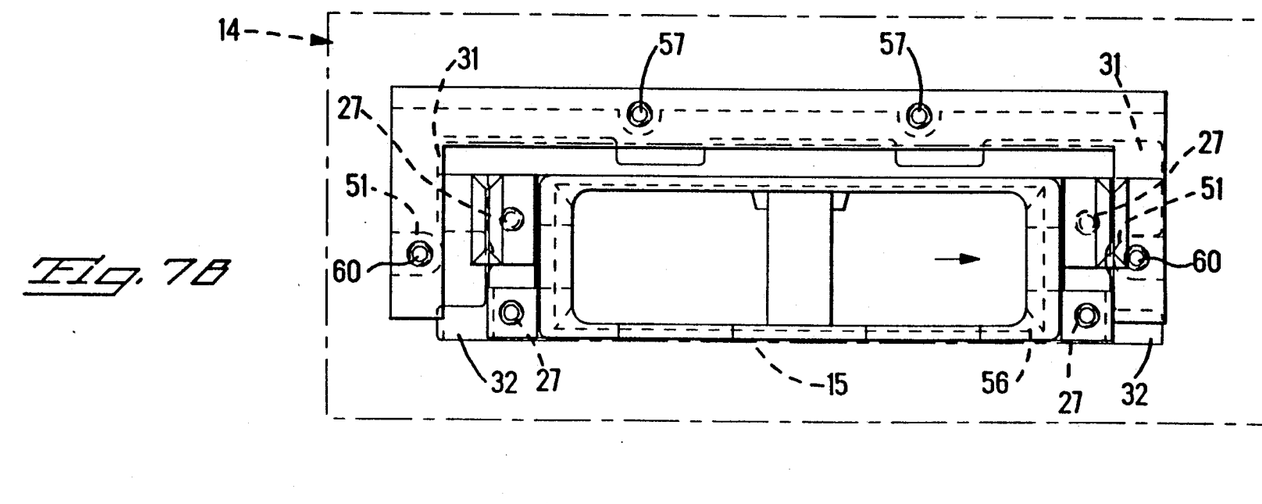
Figure 7C:
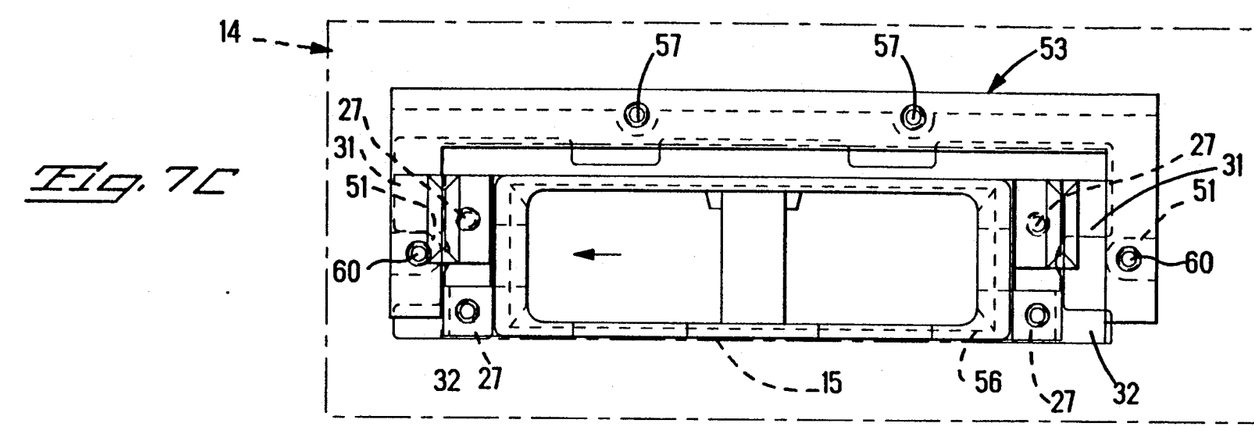
Figure 7D:
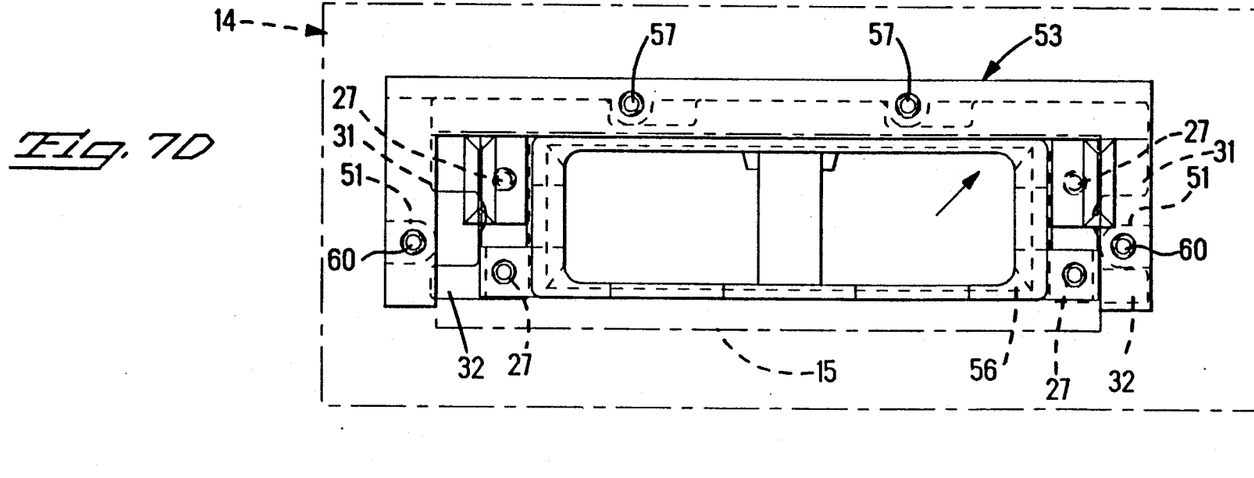
Figure 7E:
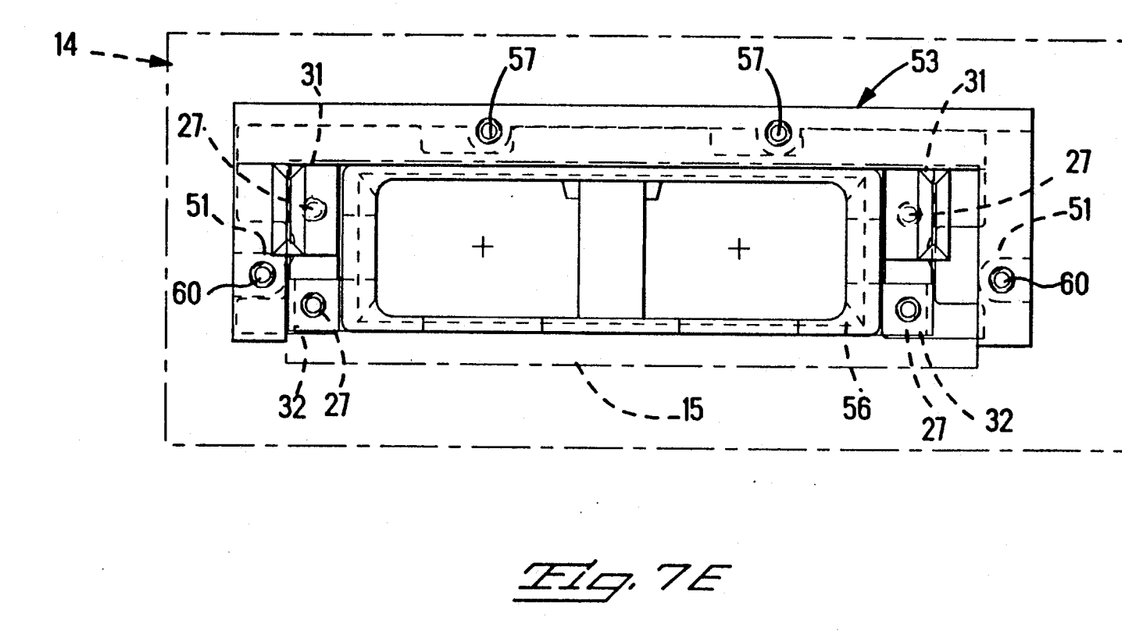

FIGS. 6A and 6B show the connection among the retention frame 48, panel front 14 and cover plate 53, the connection of the transceiver shroud 11 and latch beam mechanism 12 and the floating fit of shroud 11 and latch beam mechanism 12 within the combination of retention frame 48, panel front 14 and cover plate 53, while FIGS. 7A, 7B, 7C, 7D and 7E further illustrate the floating of the transceiver adapter within the fixed structure which is the combination of the retention frame 48, the panel front 14 and the cover plate 53. During mating of plug 8—as encompassed within transceiver adapter 10—with the transmitter/receiver device 3 misalignment may require that plug 8 be slightly elevated with respect to cover 14 in order to permit mating. FIG. 7A shows the combined structure of the retention frame 48, panel front 14 and cover plate 53 permitting the upward floating of the plug 8 and transceiver adapter 10 therewithin to facilitate mating. Correspondingly, FIG. 7B shows the plug 8 and transceiver adapter 10 floating to the right for mating; FIG. 7C shows floating to the left; FIG. 7D, floating upward and to the right; and FIG. 7E, floating upward and to the left.

During connection of half structure 6 to clip connector half 5, as illustrated in FIGS. 5A, 5B and 5C, latching beams 13 approach respective clip retention windows 21 with beveled face 34 of each beam contacting beveling of respective clip retention window 21. The beveling 20 of the retention window 21 leads the beam into aperture 19. As mating takes place the floating of the transceiver adapter 10 and plug 8 permits adjustment of the alignment of the beam 13 to the aperture 19 along the face of beveling 20. At the same time, the floating feature permits alignment of signal ports 4 of the transmitter/receiver device 3 to respective optical fibers disposed by ferrules (not shown) within plug 8. As the beam 13 progresses within aperture 19, beveled face 30 contacts dimple 24 of clip 23. Beveled face 34 imposes against dimple 24, which is biased into aperture 19 through port 22. Beveled face 34 pushes dimple 24 against the bias and to without the port 22 permitting beam 13 to progress up aperture 19. Dimple 24 snaps back into aperture 19 and into seat within port 35 of the latching beam 13, as port 35 becomes aligned with the port 22. The snap fit of the dimple 24 into port 35 retains the beam 13 within the aperture 19 of the clip half 5 with a predetermined retention force.

While what has been described constitutes a presently preferred embodiment of the invention, it should be recognized that the connector 7 of the present invention may take other forms so long as it is characterized by a retention frame 48 mounted to the cover 14 and captivating the transceiver adapter 10 with play of said adapter 10 within the frame 48. Accordingly, it should be understood that the invention is to be limited only insofar as required by the scope of the following claims.

We claim:

1. A connector for joining light transmitting fiber cables through a cover to a transmitter and/or receiver device characterized by a plug half connector comprising; a plug having axial extending bore for receiving an optical fiber; a transceiver adapter adapted to axially receive said plug through said cover and extending axially forward for aligning said plug relative to said transmitter and/or receiver device, and further comprising;

retention frame mounted to said cover and captivating said transceiver adapter with play of said adapter within said frame so as to permit free floating of said transceiver adapter relative to said cover within said retention frame.

2. The connector of claim 1 wherein said retention frame is a yoke shaped body straddling said transceiver adapter.

3. The connector of claim 2 wherein said retention frame comprises a main beam and arms extending from said main beam to form said yoke shaped body.

4. The connector of claim 3 wherein each of said arms is characterized by rearward extending pedestal defining a gap between each pedestal and said main beam, and said retention frame being mounted to said cover through each said pedestal whereby each pedestal and main beam defines spacings between said cover and said retention frame.

5. The connector of claim 4 wherein said transceiver adapter further comprises flanges extending on either side of said adapter, each of said flanges being smaller in size than each of said spacings between said cover and said retention frame, and each said flanges fitting within a respective spacing whereby said frame captivates said transceiver adapter with play of said adapter within said frame so as to permit free floating of said transceiver adapter relative to said cover within said retention frame.

6. The connector of claim 1, claim 3 or claim 5, wherein said transceiver adapter is an integral two-part structure comprising; a transceiver shroud adapted to axially receive said plug and extending axially for aligning said plug relative to said transmitter and/or receiver device, and said latching beam mechanism having forward extending latching beams.

7. The connector of claim 6 wherein said latching beam mechanism comprises a main body straddling said shroud and secured thereto and having latching beams extending therefrom.

8. The connector of claim 7 wherein each latching beam of said latching beam mechanism is a beam shaped body with forward beveled face and port.

9. The connector of claim 8 further comprising clip half connector attached to and integral with said transmitter/receiver device and having aperture therein beveled to receive said latching beam.

10. The connector of claim 9 wherein each of said latching beams has beveled forward end for interacting with the said beveled aperture of said clip half connector to align said beams to said opening upon mating of said plug half connector to said clip half connector.

11. The connector of claim 10 wherein said transceiver shroud and said latching beam mechanism are secured together with inter-engaging means to form said integral two part structure.

12. The connector of claim 11 wherein said transceiver shroud and said latching beam mechanism is a molded integral structure characterized by a transceiver shroud portion and a latching beam mechanism portion.

* * * * *